(12) United States Patent  
Swander et al.

(10) Patent No.: US 7,409,707 B2
(45) Date of Patent: *Aug. 5, 2008

(54) METHOD FOR MANAGING NETWORK FILTER BASED POLICIES

(75) Inventors: Brian D. Swander, Bellevue, WA (US); Avnish Kumar Chhabra, Bellevue, WA (US); Paul G. Mayfield, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

This patent is subject to a terminal disclaimer.

(21) Appl. No.: 10/456,433

(22) Filed: Jun. 6, 2003

(65) Prior Publication Data
US 2004/0250131 A1  Dec. 9, 2004

(51) Int. Cl.
*H04L 12/56* (2006.01)

(52) U.S. Cl. .................... 726/13; 726/11; 709/221; 709/240

(58) Field of Classification Search ............... 709/221, 709/240; 726/11–14
See application file for complete search history.

(56) References Cited

U.S. PATENT DOCUMENTS

| 5,987,611 | A | 11/1999 | Freund |
| 6,003,084 | A | 12/1999 | Green et al. |
| 6,009,475 | A | 12/1999 | Shrader |
| 2002/0162026 | A1 | 10/2002 | Neuman et al. |
| 2003/0084331 | A1 | 5/2003 | Dixon et al. |
| 2003/0212900 | A1* | 11/2003 | Liu et al. ................. 713/200 |
| 2003/0223408 | A1* | 12/2003 | Chen et al. ............... 370/352 |
| 2004/0001498 | A1* | 1/2004 | Chen et al. ............... 370/401 |
| 2004/0039840 | A1* | 2/2004 | Dispensa et al. ......... 709/242 |
| 2004/0049701 | A1* | 3/2004 | Le Pennec et al. ...... 713/201 |
| 2004/0057384 | A1* | 3/2004 | Le et al. .................. 370/252 |
| 2004/0064727 | A1* | 4/2004 | Yadav ..................... 713/201 |
| 2004/0243835 | A1* | 12/2004 | Terzis et al. ............. 713/200 |
| 2005/0005165 | A1 | 1/2005 | Morgan et al. |
| 2005/0010765 | A1 | 1/2005 | Swander et al. |
| 2005/0018682 | A1* | 1/2005 | Ferguson et al. ......... 370/392 |
| 2005/0022010 | A1 | 1/2005 | Swander et al. |
| 2005/0022011 | A1 | 1/2005 | Swander et al. |
| 2005/0076084 | A1* | 4/2005 | Loughmiller et al. .... 709/206 |
| 2005/0102423 | A1* | 5/2005 | Pelavin et al. ........... 709/238 |
| 2005/0114704 | A1* | 5/2005 | Swander .................. 713/201 |

OTHER PUBLICATIONS

Abhishek Vagish et al., NT 5.1 IPSecurity Security Policy Database, Microsoft Corporation, 1999.

* cited by examiner

*Primary Examiner*—Emmanuel L Moise
*Assistant Examiner*—Tamara Teslovich
(74) *Attorney, Agent, or Firm*—Wolf, Greenfield & Sacks, P.C.

(57) ABSTRACT

A method and system are provided for adding, removing, and managing a plurality of network policy filters in a network device. Filters are installed in a framework and designated as active or disabled. Each filter has a priority. When a new filter is to be installed into the framework, it is compared to installed filters to determine if a conflict exists. If no conflict exists, the new filter is added as an active filter. If a conflict exists, a higher priority conflicting filter is added as active and a lower priority filter is added as inactive.

13 Claims, 9 Drawing Sheets

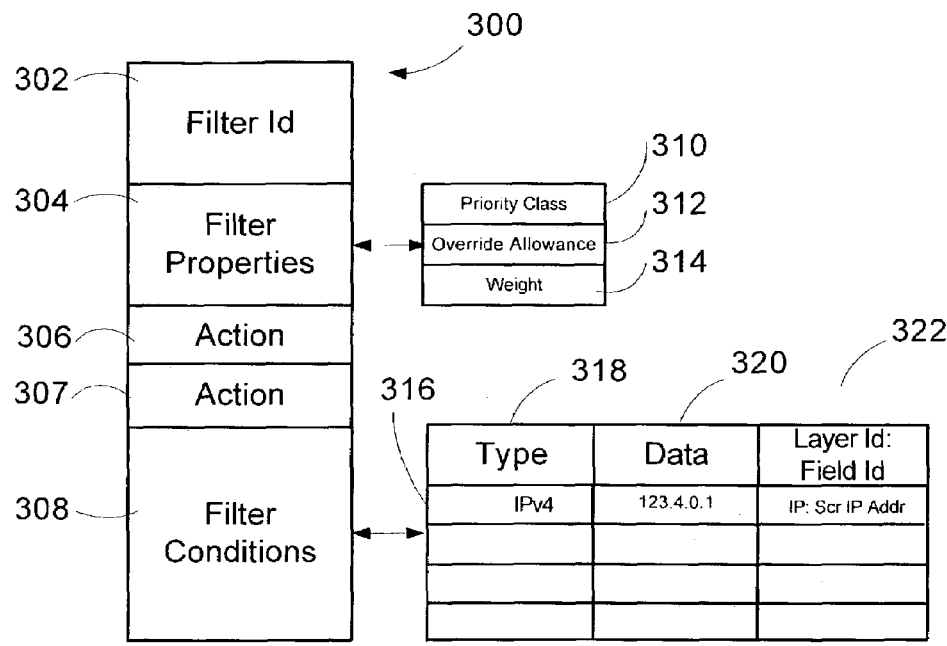

METHOD FOR MANAGING NETWORK FILTER BASED POLICIES

RELATED APPLICATIONS

The present application contains subject matter related to that of patent application "Multi-Layer Based Method for Implementing Network Firewalls," Ser. No. 10/456,770; "Multi-Layered Firewall Architecture Implemented in a Network Device," Ser. No. 10/456,770; and "A Method and Framework for Integrating a Plurality of Network Policies," Ser. No. 10/456,093, filed on the same day as the present application, the disclosures of which are hereby expressly incorporated by reference.

TECHNICAL FIELD

This invention generally relates to computer systems and to computer networks. More particularly, this invention relates to managing network filter based policies.

BACKGROUND OF THE INVENTION

Computers implement various network policies to control network traffic and to protect a computer or other network device from malicious attacks perpetrated by other network devices, such as theft of data, denial of service (DOS) attacks, and the like.

One type of policy used to protect network devices is implemented through a tool known as a firewall. The firewall protects individual users, network devices, and networks in general, from malicious attacks, while also adding the ability to control the exchange of data. The firewall implements the policy by examining network packets and determining, based on the examination, whether the packets should be permitted, or conversely blocked, from further traversing the network. Firewalls perform other functions such as logging information pertaining to packets for future inspection.

The firewall uses filters to implement the policy. Each filter includes filter parameters and an action. The filter parameters identify network packets that are subject to the policy and include information such as hardware addresses, e.g. Media Access Control (MAC) addresses, network addresses, e.g. Internet Protocol (IP) addresses, protocol type, e.g. Transport Control Protocol (TCP), port numbers, and the like. The action defines how packets with parameters that match the filter parameters should be treated. As a specific example, the filter includes as its parameters a Uniform Resource Locator (URL) address, e.g. "http://www.foo.com." The filter further associates the action of block, i.e. drop the packet, with that URL address. Whenever the firewall examines a packet and through that examination identifies the URL address "http://www.foo.com" as embedded in the packet, the firewall drops the packet thereby preventing it from traversing the network.

The firewall includes multiple filters to implement the policy and two or more filters may conflict. Two or more filters conflict when they apply to a common subset of network packets and designate different actions. For example, one filter designates that a network packet should be permitted to traverse the network while a different filter designates that the same network packet should be blocked from network traversal. Where conflicting filters exist within a network device, it becomes unpredictable how the overall system will respond to network traffic.

SUMMARY OF THE INVENTION

The invention is directed towards a method and system for adding a new filter defining a portion of a network policy into a set of installed filters in a framework. The framework includes an active filters and disabled filters. The active filters identify filters in the set of installed filters used to implement current network policy. The disabled filters identify filters in the set of installed filters that are not used to implement current network policy.

The new filter and the set of installed filters each include a set of filter conditions and a priority class. The filter conditions identify network packets that are subject to the policy defined in the filter. The priority class identifies priority of the filter according to the user or process responsible for the policy defined in the filter.

A firewall engine determines whether the new filter and at least one of the filters in the set of installed filters conflict. If the new filter conflicts with one of the installed filters, the firewall engine determines whether the priority class of the new filter is lower than the priority class of the at least one installed filter. The firewall engine then installs the new filter into the set of installed filters.

In an embodiment of the invention, the firewall engine uses the priority class of the new filter and the at least one of the installed filters to determine whether the new filter is added as a disabled filter or as an active filter. If the priority class of the new filter is lower than the priority class of the at least one installed filter, the new filter is added as disabled. If the priority class of the new filter is higher than the priority class of the at least one of the installed filters, the new filter is added asactive, provided that other higher priority class conflicting filters do not exist, and the at least one of the installed filters is added as disabled.

In another embodiment of the invention, each filter includes a weight value that further identifies priority of the filter and that is used to identify filter conflicts in conjunction with the priority class. The weight value is automatically calculated from the set of the filter conditions. Each of the filter conditions is scaled to fit in a bit allocation within the weight value. Alternatively, the weight value is an assigned value.

The invention is also directed to a method of removing filters from the set of the installed filters. After the filter is removed, the firewall engine determines whether the removed filter was an active filter. If the removed filter was identified as active, the firewall engine identifies overridden disabled filters that were disabled as conflicting with the removed filter. The overridden filters are then added as active, which may in turn cause other filters to be disabled.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is a block diagram illustrating an exemplary filter used with the present invention;

FIG. 4 is a block diagram illustrating an exemplary data structure for packet context used with the present invention;

DETAILED DESCRIPTION OF THE INVENTION

Figure 1:
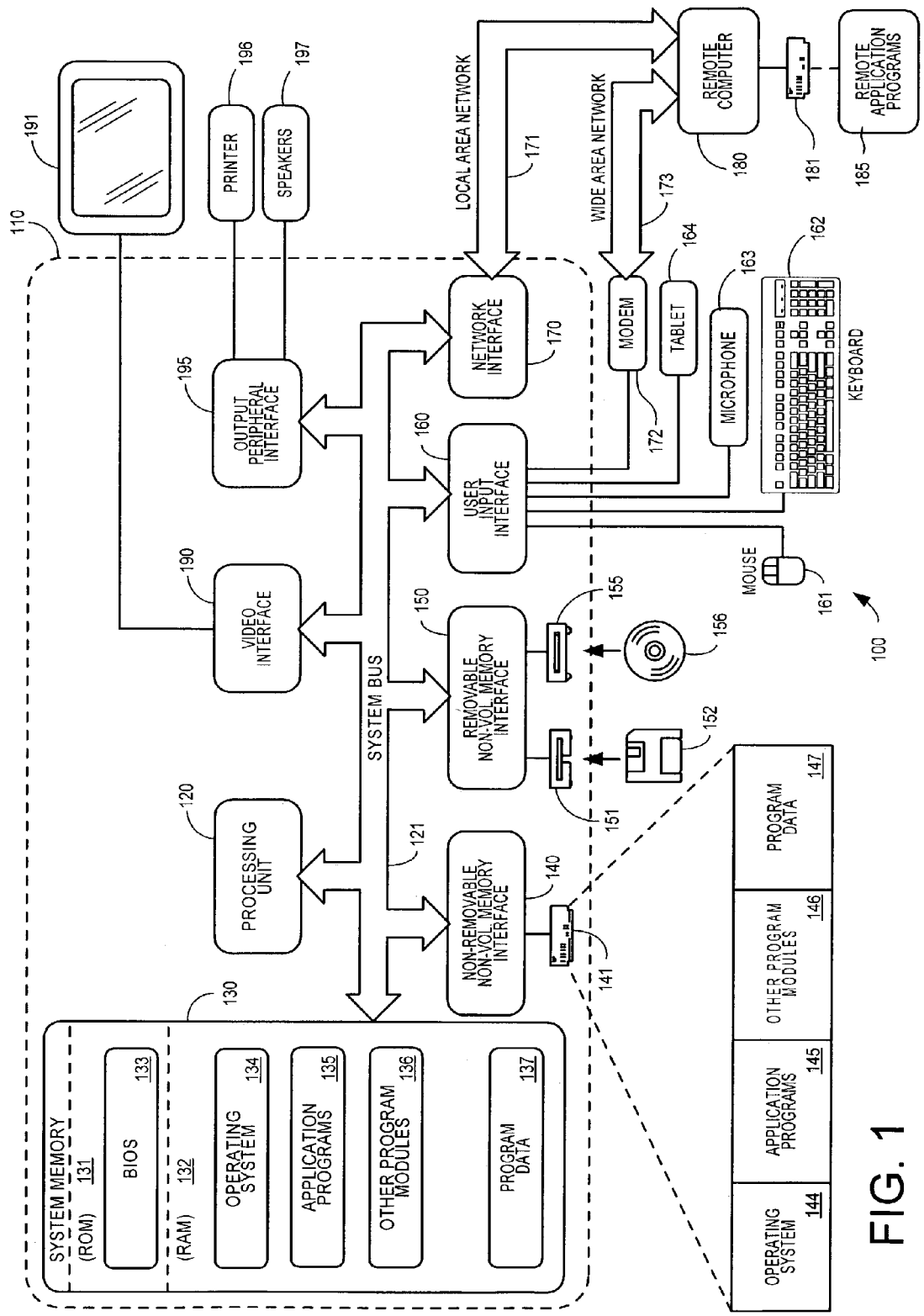
FIG. 1 is a block diagram generally illustrating an exemplary computer system on which the present invention resides.

A method of maintaining and resolving conflicts among network filter based policies is disclosed. The method is capable of identifying and resolving filter conflicts when new filters are installed in a network device.

The network filter based policies are defined by filters installed in a firewall framework. Although the framework is designed to implement firewall policy, the framework is equally suitable for facilitating other filter based policies such as Internet Protocol Security (IPSec), Quality of Service (QOS) and the like.

The framework includes a kernel mode process comprising one or more kernel layers forming a protocol stack, a kernel firewall engine, and one or more callouts. The protocol stack includes an application layer, a transport layer, a network layer, and link layer. The kernel firewall engine includes a layer Application Programming Interface (API), a set of installed filters, and a callout API.

The user mode process includes a user firewall engine, policy providers, and one or more user layers. The user firewall engine also includes an instance of the kernel firewall engine, referred to as a filter module that replicates the services of the kernel firewall engine in user mode and that also includes a set of installed filters.

The user and kernel layers each form a requesting layer capable of sending a classification request to the kernel or user firewall engine. The classification request includes a packet received by the requesting layer, a packet context, and a set of layer parameters associated with the requesting layer. The kernel or user firewall engine processes the request and returns firewall or other network policy defined by the set of installed filters.

Each of the set of installed filters includes a set of filter conditions, an action, a set of filter properties, and possibly other data defining network policies. The filter conditions identify packets or other data subject to the network policy defined in the filter. The action is used to define the policy in the filter and usually identifies whether packets matching the filter should be permitted to traverse a network or, conversely, should be blocked. The filter properties are used to identify the relative priority of the filter with respect to other filters and to identify actions that may taken by lower priority conflicting filters.

The kernel firewall engine processes the classification request sent from the requesting layer by identifying one or more matching filters. The matching filters have filter conditions that match the layer parameters and packet context. Once the matching filters are identified, they are applied in order of filter priority. Actions to be taken on the packets are returned to the requesting layer.

The policy providers obtain policy from any suitable source such as volatile or non-volatile memory. The policy is a source of information for rendering a new filter, including the set of filter conditions, associated actions, and filter properties. The user firewall engine adds the new filter to the set of installed filters in the kernel firewall engine via a management API.

The user firewall engine adds new filters into the installed filters, removes filters from the installed filters, and identifies and resolves filter conflicts. Filter conflicts are resolved by placing one filter of two conflicting filters in an active state and the other filter of two conflicting filters in a disabled state.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
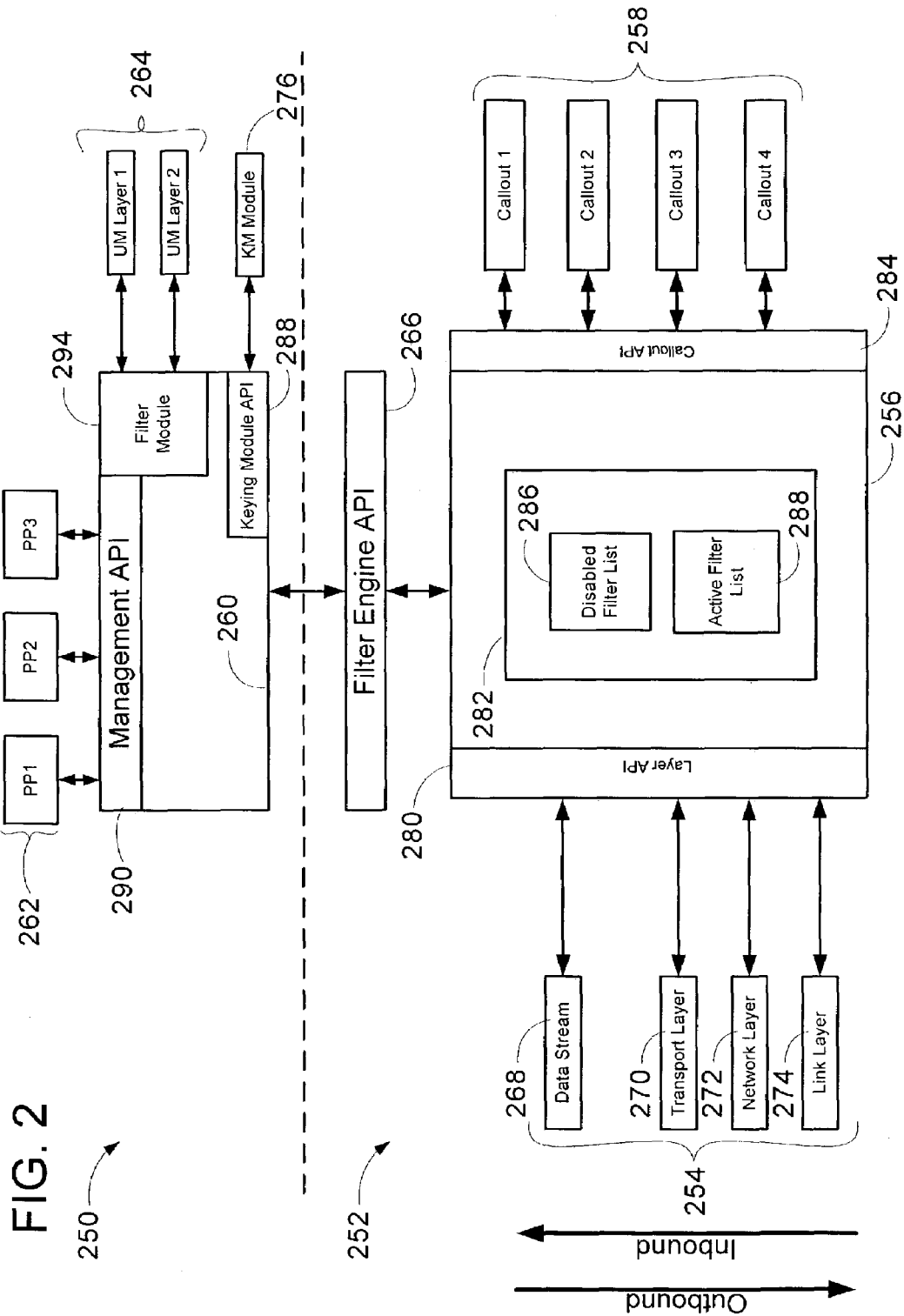
FIG. 2 is a block diagram generally illustrating a framework in which the method and system of the present invention may be implemented.

FIG. 2 shows an embodiment of a framework used to implement the method and system of the present invention. It will be understood that the framework is exemplary and is only used by way of illustration and not limitation. The framework allows the method and system of the present invention to centrally manage network policies by allowing filters to be added and removed and for filter conflicts to be identified and resolved. Although the invention is described with specific reference to firewalls and firewall filters, it is also used to facilitate and manage other filters based network policies such as Quality of Service (QOS), Internet Protocol Security (IPSec) suite, as well as other encrypting, authenticating, and key management security protocols.

The firewall architecture includes a user mode process 250 and a kernel mode process 252. The user mode process 250 and kernel mode process 252 execute as part of an operating system in a network device. Those skilled in the art will appreciate that the user mode process 250 and the kernel mode process 252 of the operating system include additional components that for simplicity are not shown. Alternatively, the firewall architecture is executed in whole or in part within a single operating system process or outside of the operating system as one or more program modules or application programs.

The kernel mode process 252 includes kernel layers forming a network stack 254, a kernel firewall engine 256, and optional callouts 258. The network stack 254 comprises a plurality of layers including a data stream layer 268, a transport layer 270, a network layer 272, and a link layer 274. The layers in the network stack 254 process inbound and outbound network packets. Outbound network packets are packets being transmitted from the network device implementing the firewall architecture onto a network. Inbound packets are packets received at the network device implementing the firewall architecture. As indicated by the respective arrows shown in FIG. 3, inbound packets traverse the network stack 254 from bottom to top and outbound packets traverse the network stack 254 from top to bottom.

Network packets traverse, and are processed by, the network layers sequentially. In accordance with known techniques, each layer in the network stack 254 is capable of receiving packets from a previous layer or module, processing the packet according to a specification or protocol, and sending the processed packet to a next layer or module. The framework implemented according to the present invention further enables each layer in the network stack 254 to maintain packet context, pass the packet context to the next layer, issue a classification request to the kernel firewall engine 256, and take action on the packet according to firewall or other network policy.

The packet context is a data structure that follows the packet from layer to layer. Each layer maintains the context by adding into the context data structure a set of parameters that the layer is designed to process, e.g. the information that the layer is designed to parse from inbound packets, add to outbound packets, or otherwise derive from an inbound or outbound packet. An exemplary data structure used for the packet context is described with reference to FIG. 4.

One of the operations carried out by the layers of the network stack 254 is to invoke the kernel firewall engine by issuing the classification request. The classification request is a call by a layer in the network stack 254 requesting that any filters that match the packet be identified and any associated action, e.g. permit or block, be returned to the layer. The layer issuing the classification request is referred to herein as a requesting layer. Each layer also takes the action on the packet that is returned by the kernel firewall engine 256.

The kernel firewall engine 256 includes a layer API 280, a set of installed filters 282, and a callout API 284. The kernel firewall engine 256 performs various functions including (1) storing the set of installed filters 282, (2) receiving classification requests from the layers in the network stack 254, (3) identifying one or more matching filters from the set of installed filters 282 based on the classification request, and (4) instructing the requesting layer of any action to take on the packet based on the matching filters.

Each filter of the set of installed filters 282 includes a set of filter conditions, an action, filter properties, and a filter Id. The filter conditions identify the network packets that are subject to the action and possibly other network policy identified in the filter. The action identifies applicable network policy such as permit or block. The filter properties include a priority class, an override allowance, and a weight. The filter properties are used to determine whether a filter is an active filter or a disabled filter, an order that active filters are applied to matching packets, and whether an active filter is applied to a matching packet. An exemplary form of the filters is described with reference to FIG. 3.

Associated with the set of installed filters 282 is a disabled filter list 286 and an active filter list 288. The active filter list 288 identifies filters that are in an active status and that are used to implement network policy. The disabled filter list 286 identifies filters that are in an inactive or disabled status and that are not presently being used to implement network policy but that may be later placed in an active status. Alternatively, the invention does not maintain the active filter list 288 and the disabled filter list 286 and tracks the status of each filter using a different method, for example within a field maintained within each filter or other equivalent method.

In an embodiment of the invention filters are assigned to a specific user layer 264 or kernel mode layer 254. Each layer includes a separate set of installed filters 282, a separate disabled filter list 286, and a separate active filter list 288. Alternatively, only a single set of installed filter and active and disabled filter lists are maintained.

The layer API 280 provides an interface between the layers in the network stack 254 and the kernel firewall engine 256. Through the layer API 280, the requesting layer issues the classification request to the kernel firewall engine 256. The classification request includes the packet as received by requesting layer, the packet context as received by the requesting layer, and layer parameters. The layer parameters are packet parameters processed by, e.g. added, parsed or otherwise derived from the packet by the requesting layer. As a specific example, source and destination Internet Protocol (IP) addresses are layer parameters sent by the network layer 272 when implementing the IP protocol. Layer parameters may also include information beyond the packet parameters that are added to or parsed from the packet. As a specific example, the layer parameters include a local address type. The local address type is determined by the IP layer and sent as part of the classification request. Local address types include unicast, broadcast, multicast, anycast and the like. A specific implementation of the layer API 280 is described with reference to FIG. 5.

Optionally, the callouts 258 are used to implement added functionality beyond the permit and block filter actions. A callout is executed when the kernel firewall engine 256 identifies a matching filter for the packet that includes, as the associated action, a callout to one of the callout modules. The kernel firewall engine sends the classification request as issued by the requesting layer, i.e. full packet, layer parameters, and packet context, to the callout module, along with an identification of the matching filter, via the callout API 284. In an embodiment of the invention, the firewall architecture includes a base set of callouts 258. Additional callouts, like layers, are added as needed thereby providing an extensible framework. A specific implementation of the callout API 284 is described with reference to FIG. 6.

The user mode process 250 includes the user firewall engine 260 and one or more policy providers 262 identified as "PP1," "PP2," and "PP3." The policy providers 262 are processes that add network policy, i.e. installed filters 282, into the framework described herein. Any process is used to accomplish this task. The user firewall engine 260 converts the policy into a new filter, i.e. defines the policy in terms of the filter conditions, the action, the filter properties and adds the new filter to the set of installed filters and adds the filter to the active filter list or the disabled filter list.

The user firewall engine 260 also performs filter arbitration and conflict resolution functions. When the policy provider 262 provides new policy to the user mode firewall engine 260, the user firewall engine determines whether the new filter resulting from the new policy conflicts with any of the installed filters 282. A conflict occurs when two or more filters (1) specify different actions, (2) overlap, (3) have different priority classes, (4) the filter with the lower priority class has a higher weight value, and (5) the action specified in the filter with the lower priority class is not specified as an override allowance in the higher priority filter. Filters overlap if they include a common set of filter conditions, i.e., filter conditions within an equal value or ranges of values that intersect. The override allowance defines actions in lower priority filters that may override the filter. If a conflict exists, the user firewall engine 260 resolves the conflict.

The filter engine API 266 forms an interface between the user mode firewall engine 260 and the kernel firewall engine 256. The filter engine API 266 provides a mechanism for the user firewall engine 260 to add new filters into the set of installed filters 282, remove filters from the set of installed filters, and to examine installed filters 282 so that filter conflicts can be detected and resolved. The management API 290 exposes similar functionality to the policy providers 262.

A keying module API 288 provides an interface between the user policy engine 260 and keying module 296. The keying module API 288 is used to signal the keying module of the need to establish an SA.

The user firewall engine 260 also includes a filter module 294. The filter module 294 is an instance of the kernel firewall engine 256 in the user mode 250. The instance of the filter module 294 in the user firewall engine 260 permits the user firewall engine 260 to replicate the services of the kernel firewall engine 256 for one or more user layers 264. The user mode layers 264 are added in the same way that kernel mode layers are created. Because the filter module 294 is the user mode instance of the kernel firewall engine 256, it will be understood that any functionality described herein for the kernel mode firewall engine also applies to the filter module 294. For example, additional user mode layers are added or deleted from the system architecture and callouts may be created thereby providing added functionality to the user mode layers. Filters may be added or removed from the filter module 294. The user firewall engine 260 also resolves filter conflicts for filters in the filter module 294.

Referring to FIG. 3, the set of installed filters 282 will now be described. Each filter 300 has a plurality of fields including the filter Id 302, the filter properties 304, the action 306, and the set of filter conditions 308. The filter Id 302 provides a unique identification to the filter. The filter Id 302 is used, for example, as a means for the kernel firewall engine 256 to return matching filter information to the user firewall engine 260 and the callouts 258. The filter Id 302 is used by the kernel firewall engine 256 to track which filter is assigned to which layer. The filter Id 302 is also used as part of the disabled filter list 286 and the active filter list 288 to identify which filters are inactive and active respectively.

The filter properties 304 include a priority class 310, an override allowance 312, and a weight 314. The priority class 310 is a value that specifies the class of the user that added the filter 300 via one of the policy providers 262. Examples of priority classes include user, administrator, firewall client, and guest. The higher the priority class, the higher the priority of the filter.

The override allowance 312 identifies the actions specified in lower priority filters that are permitted to override the filter 300. Examples of override allowances 312 include: allow, block, log, callout, all-actions, or none. The default override allowance is none.

The weight 314 is any unsigned value. The default size of the weight is 64-bits. The weight value, in conjunction with the priority class 310, determines the overall filter priority. The higher the value in the weight field, the higher the filter priority. The weight 314 is automatically calculated by the user firewall engine 260 based on specificity of the filter conditions and possibly other criteria. Alternatively, the weight is a user entered value. A user may also modify the weight field if it is automatically calculated by the user firewall engine 260.

The set of filter conditions 308 determine whether a packet matches the filter 300. Each filter condition 308 includes a type 318, data 320, and a layer Id:field Id 322.

The type 318 defines the length and number of variables included in the corresponding data field 320. The framework provides for predefined known variable types such as Byte, Short, Long, 8 Bytes, String, Internet Protocol version 4 (IPv4) Address, Internet Protocol version 6 (IPv6) Address, IPv4 Address plus Mask, IPv6 Address plus Mask, and Address Range.

The data field 320 includes data matching the type 316. For example, if the type is IPv4 Address, an acceptable value for the data field 320 is a 32-bit number in range of 00.00.00.00 to 255.255.255.255 as expressed in dotted decimal notation. In some instances, the type 318 provides for multiple values in the data field 320. The Address Range, IPv4 Address plus Mask, and IPv6 Address plus mask types allow two IP address values, defining a beginning and ending range of IP addresses. For maximum flexibility, the architecture also permits user-defined types. Alternatively, additional types are manually added to the framework.

The layer Id:field Id field 322 is used to identify an originating layer and a parameter from the originating layer, respectively. The originating layer and the parameter from the originating layer define packet parameters, i.e. layer parameters and packet context that the data 320 is compared against when identifying matching filters. The originating layer identifies a kernel or user layer. The parameter identifies a specific originating layer parameter. A specific example is illustrated by filter condition 316. The type is IPv4 thereby indicating the data 320 is a 32-bit IP address. The layer Id is "IP" representing that the 32-bit number is a network layer parameter. The field Id is "Src IP Addr" which identifies the IP layer parameter as a source IP address. The IP address provided in the data filed is "123.4.0.1" which identifies the specific IP source address. Packets with the source IP address of 123.4.0.1 match the filter conditions described in the example.

The filter 300 can include multiple filter conditions 308 in which case a packet matches the filer 300 when all filter conditions are satisfied.

The action 306 designated in the filter 300 identifies how to treat packets that match the filter conditions 308. Examples of actions include permit and block. Permit and block identify firewall policy that indicates that matching packets should be permitted to further traverse the network or conversely should be blocked. Other actions may be included such as callout to execute optional callouts for added functionally or to execute policy, such as IPSec. Other network policies may also be executed by defining the other network policies in a data structure referred to as a policy context data structure described below.

The policy context 307 is used to store policy other than firewall policy, such as security policy or QOS policy. The policy context is any suitable data structure. For example, the policy context is a 64 bit number that is interpreted by a process that added the policy context. The policy context and/or action may be a null value.

In an embodiment of the invention, actions are designated terminating or non-terminating. If the action is terminating, once that action is identified for a packet, the action is returned to the requesting layer and no additional filters are applied to the packet. If the action is non-terminating, additional filter lookups continue until a terminating action for the packet is identified. As a default, permit and block are designated terminating actions.

FIG. 4 illustrates an example of a data structure 330 used for the packet context that is maintained by, and passed to, the layers in the network stack 254 and the callout modules 258. The packet context may also be used by one or more user layers 264. The packet context 330 follows the inbound or outbound network packet as it traverses the layers and includes one or more entries, labeled 336-340. Each entry includes a layer Id:field Id 332 and a corresponding value 334.

The layer Id:field Id 332 has the same meaning as the layer Id:field Id 324 provided as part of the filter conditions 308 in the filters 300 (FIG. 4). Namely, the layer Id:field Id 322 identifies the originating layer and the layer parameter from the originating layer for the data in the value field 334. The value field 334 includes a specific layer parameter.

As a specific example, entry 336 includes the layer Id:field Id 332 "NDIS: Src. MAC Addr." "NDIS" represents a NDIS implementation of the link layer 274 (FIG. 1). "Src MAC addr." represents a source MAC address. Thus, the layer:field Id 332 indicates that the data in the value field 334 is a source MAC address that was processed and added by the NDIS (Link) layer. The value field 334 includes the actual source MAC address which in the example is "00.08.74.4F.22.E5" as expressed in hexadecimal notation.

As a second example, entry 338 has a layer Id:field Id 332 of "NDIS:IF No." This again identifies the layer as NDIS, but in this case identifies the parameter as "IF No" representing an interface number as the specific NDIS parameter. The value field 334 includes the actual interface number, which in this case is 2.

As a third example, entry 340 has a layer Id:field Id 332 of "IP:Dst IP Addr." The "IP" represents the network layer using the IP protocol and the "Dst IP Addr" represents a destination IP address as the IP layer parameter. The value field 334 includes the actual destination IP address of "123.3.2.1."

Figure 5:
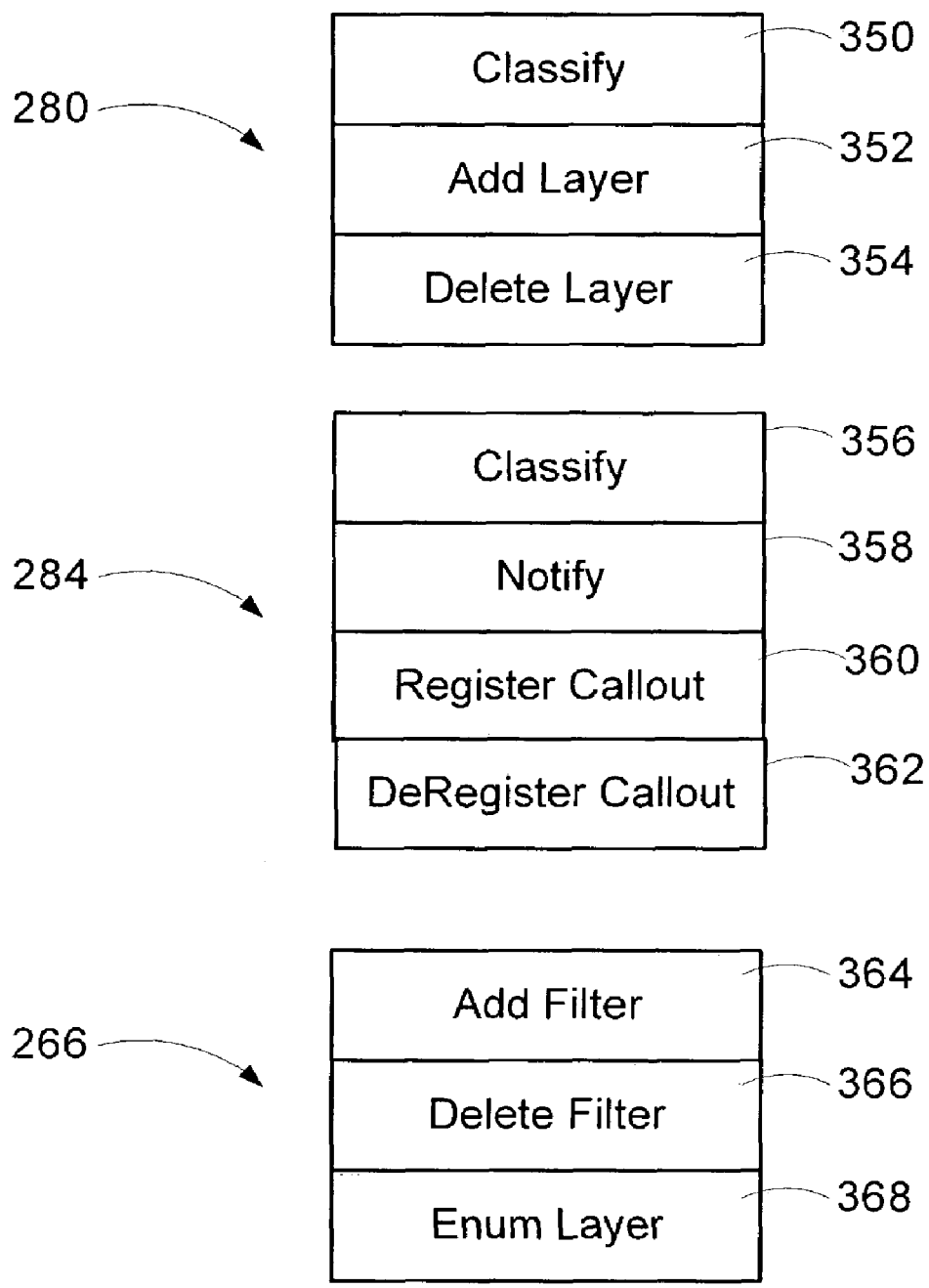
FIG. 5 is a block diagram illustrating an exemplary set of application programming interfaces used with the present invention.
Figure 6:
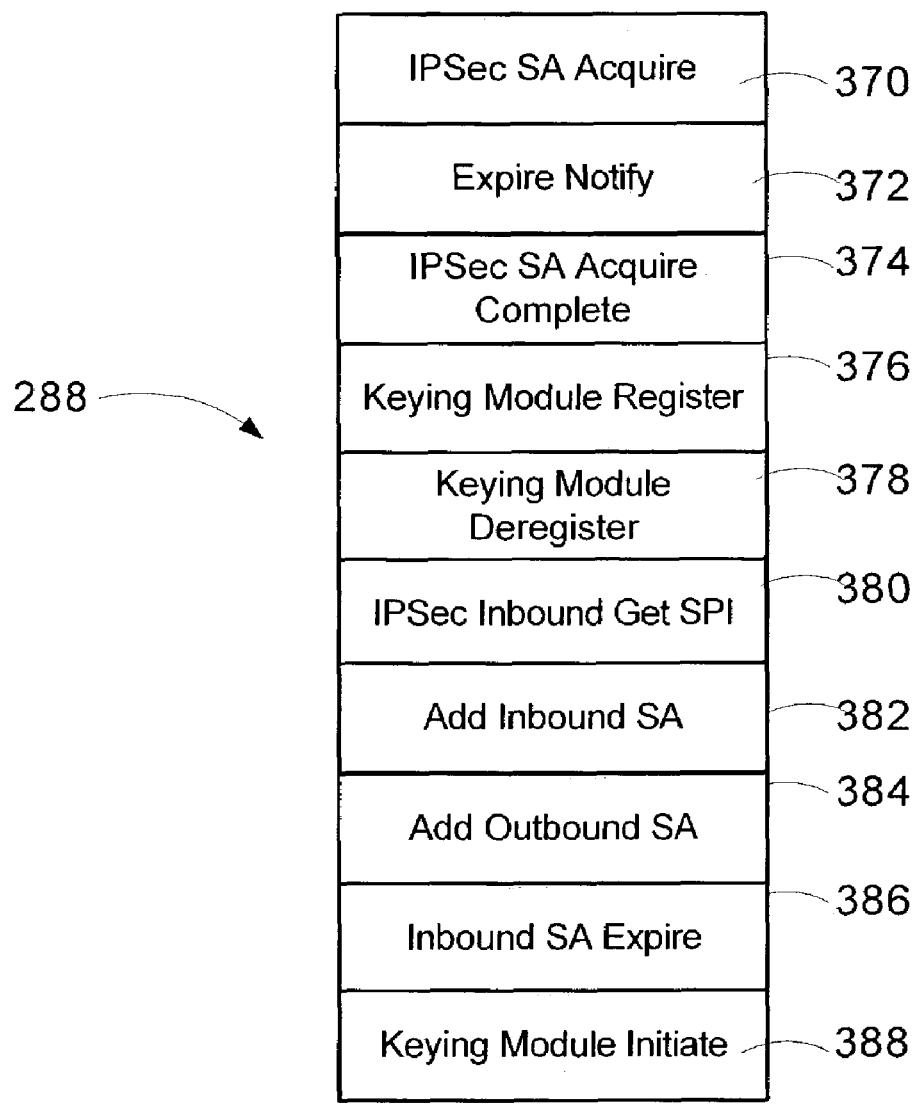
FIG. 6 is a block diagram illustrating an application programming interface used with the present invention.

Having described the underlying firewall architecture of the present invention, attention is drawn to the functional interfaces of the system and exemplary methods that are performed using the underlying framework described herein. The functional interfaces are implemented as a plurality of application programming interfaces (APIs). The APIs include the layer API 280, the callout API 284, the firewall engine API 266, and the keying module API 276 as shown in FIG. 5 and FIG. 6.

The layer API 280 facilitates data exchange between each of the layers in the network stack 254 and the kernel firewall engine 256. As shown, the layer API 280 includes a Classify method 350, an Add Layer method 352, and a Delete Layer method 354.

The Classify method 350 is used by the requesting layer to send layer parameters, the packet as received by the requesting layer, and the packet context to the kernel firewall engine 256. The kernel firewall engine 256 compares the (1) layer parameters from the requesting layer and (2) packet context entries to the filter conditions 308 in each filter 300 assigned to the requesting layer to identify matching filters. The following is an exemplary implementation of the Classify method. It will be understood that the following methods are described as receiving or returning data values. According to known programming techniques, the methods may use pointers to data values instead of actual data values.

```
NTSTATUS
WFPClassify
(
    IN ULONG                         LayerId,
    IN WFP_INCOMING_VALUES*          pInFixed Values,
    IN WFP_INCOMING_CONTEXT_VALUE*   pInContext,
    PVOID                            pPacket,
    OUT WFP_ACTION_TYPE*             pActionType,
    OUT UINT64*                      pOutContext
);
```

Where the following characterizes the recited parameters.

LayerId identifies the network layer issuing the classification request, i.e. the requesting layer. Referring to FIG. 3, the layer Id identifies the layer as the data stream layer 268, the transport layer 270, the network layer 272, the link layer 274 or a user mode layer 264. Other layers are valid if added to the system.

pInFixedValues includes a subset of the layer parameters processed by the requesting layer. The pInFixedValues, along with the packet context entries, are compared to the filter conditions to determine if the packet matches the filter. Exemplary layer parameters included in the pInFixedValues for each layer are identified in Table A below. It will be understood that these parameters are merely by way of example, and not limitation.

TABLE A

| Layer | Default Layer Parameters |
|---|---|
| Link Layer | Source and Destination MAC Addresses; Interface Number |
| Network Layer | Source and Destination IP Addresses; Protocol Type; Local Address Type |
| Transport Layer | Source and Destination Port Numbers; |
| Application | Deciphered application layer protocol payload | pInContext includes the context data structure 330 (FIG. 4) as received by the requesting layer. The packet context is used by the kernel firewall engine 256 in conjunction with the layer parameters to identify matching packets.

pPacket includes the entire packet as received by the requesting layer. The pPacket is not used by the kernel firewall engine 256 to identify matching filters. As previously described, the kernel firewall engine 256 uses the pInFixedValues and pInContext to identify matching filters. The pPacket is included in the Classify method so that the kernel firewall engine 256 can send it to one or more callout modules 258 identified as the action 306 in matching filters.

pActionType includes the action 306 that is returned to the requesting layer. The action 306 returned is permit or block as identified in the matching filter, or callout modules executed by the matching filter. If no matching filter exists, a default action 306 of permit is returned.

pOutContext is a data structure that, in addition to the action, is designed to include data further defining network policies such as QOS, IPSec and the like. The pOutContext is any suitable data structure, for example, is a 64 bit entry that includes a stream of data to be interpreted by a layer or process adding the pOutContext.

The Add Layer 352 and Delete Layer 354 methods are used to add and remove a layer from the firewall architecture, respectively. The following is an exemplary form of the Add Layer 352 method.

NTSTATUS

AddExtensionLayer(OUT PULONG pLayerId);

Wherein the following characterizes the recited parameter.

pLayerId is a unique layer identification value returned to the layer being added, i.e. the layer executing the Add Layer method.

The following is an exemplary form of the Delete Layer 354 method.

NTSTATUS

RemoveExtensionLayer(ULONG LayerId);

Wherein the following characterizes the recited paramter.

LayerId identifies the layer being removed; i.e. the layer executing the Delete Layer method.

The callout API 284 facilitates data exchange between the kernel firewall engine 256 and the callouts 258. The callout API 284 includes a Classify method 356, a Register Callout method 360, and a Deregister Callout method 362.

The Classify method 356 of the callout API 284 is similar to the Classify method 350 of the layer API 280 except that it also includes matching filter data. The following is an exemplary form of the Classify method 410 used to execute a callout.

```
typedef NTSTATUS (*WFP_CALLOUT_CLASSIFY_FN)
(
    IN const WFP_INCOMING_VALUES*        fixedValues,
    IN WFP_INCOMING_CONTEXT_VALUE*       wfpContext,
    IN VOID*                             packet,
    IN WFP_FILTER*                       matchedFilter,
    OUT WFP_ACTION_TYPE*                 action,
    OUT UINT64*                          outContext
);
```

Wherein the following characterizes the recited parameters.

fixedValues includes the layer parameters sent from the requesting layer. The fixed values is the same data provided by the requesting layer in pInFixedValues data sent as part of the Classify method 350 in the layer API 280.

wfpContext includes the context data structure 330 (FIG. 4). This data is the same as sent by the requesting layer in the pInContext sent as part of the Classify method 350 in the layer API 280.

Packet includes the entire packet as received by the requesting layer. This data is the same as sent by the requesting layer in the pPacket sent as part of the Classify method 350 in the layer API 280.

matchedFilter identifies the filter requesting the callout. Typically, the matching filter is identified by the filter Id 302 of the matching filter 300 initiating the Classify method 356 of the callout API 284.

pActionType includes the action that is returned to the kernel firewall engine 256 from the callout 258. If the pActionType is permit or block, it is returned to the requesting layer as the pActionType returned by the layer API 280. The callout can also return a continue action that instructs the kernel firewall engine 256 to continue applying matching filters to the packet.

pOutContext is a data structure that, in addition to the action, is designed to include data further defining network policies such as QOS, IPSec and the like. The pOutContext is any suitable data structure, for example, is a 64 bit entry that includes a stream of data to be interpreted by a layer or process adding the pOutContext.

The Notify method 358 is used to notify a callout when a filter 300 is added to the set of installed filters 282 that identifies as one of its actions 306, the callout module 258. The notify provides the callout with an opportunity to take any required action such as allocating or de-allocating buffers that will be used by the callout 258 when it is executed by the kernel firewall engine 256. The following is an exemplary form of the Notify method 358.

```
typedef NTSTATUS (*WFP_CALLOUT_NOTIFY_FN)
(
    IN WFP_NOTIFY_ENUM      notify,
    IN WFP_FILTER*          filter
);
```

Wherein the following characterizes the recited parameters.

notify includes a numerical value that indicates whether the filter is being added or deleted. For example, a value of 1 indicates the filter is being added and a value of 2 indicates that the filter is being deleted.

filter identifies the filter being added or deleted by unique value. This may be accomplished by providing the filter Id 302 included as part of the filter 300.

The Registration method 360 and the Deregistration method 362 are used to add and remove callout modules, respectively. An exemplary form the Registration method 360 is as follows:

```
NTSTATUS WfpRegisterCallout
(
    IN const GUID*                  calloutId,
    IN const WFP_CALLOUT*           callout,
    IN const SECURITY_DESCRIPTOR*   sd
);
```

Wherein the following characterizes the recited parameters.

callout Id provides a unique identification for the registering callout module.

callout provides any callout specific information such as a driver service name, device name, and pointers to the callout classify and notify functions.

sd provides a security descriptor for the callout. The security descriptor identifies which processes can read and delete the callout.

An exemplary form of the Deregistration method 362 is as follows:

```
NTSTATUS WfpDeregisterCallout
(
    IN const GUID*      calloutId
);
```

Wherein the following characterizes the recited parameter.

callout Id is the unique Id of the callout to be removed.

The filter API 266 facilitates data exchange between the user firewall engine 260 and the kernel firewall 256 engine. As shown, the filter engine API 266 includes an Add Filter method 364, a Delete Filter method 366, and an Enum Layer method 368. The methods of the filter engine API 266 are also provided as part of the management API 290.

The Add Filter method 364 and Delete Filter method 366 are used to add a new filter to the set of installed filters 282 and to delete an existing filter from the set of installed filters 282, respectively. The following is an exemplary form of the Add Filter method 418.

```
NTSTATUS
AddFilterToLayer
(
    ULONG        LayerId,
    WFP_FILTER*  pFilter
);
```

LayerId identifies the layer that the filter is assigned to.

Wherein the following characterizes the recited paramters.

pFilter is the filter 310 being added to the set of installed filters 282.

The following is an exemplary form of the Delete Filter method 420.

```
NTSTATUS
DeleteFilterFromLayer
(
    ULONG    LayerId,
    ULONG    FilterId
);
```

Wherein the following characterizes the recited parameters.

LayerId identifies the layer that the filter is assigned to.

pFilter is the filter being deleted from the set of installed filters.

The Enum Layer method 368 provides a mechanism for the user firewall engine 260 to identify all filters matching a set of criteria. This allows the filter engine API 266 to identify conflicting filters for filter arbitration and conflict resolution. The following is an exemplary form of the Enum Layer method 368.

```
IndexStartEnum
(
    PWFP_ENUM_TEMPLATE     pEnumTemplate,
    OUT PULONG             pMatchCount,
    OUT PWFP_ENUM_HANDLE   pEnumHandle
)
```

Wherein the following characterizes the recited parameters:

pEnumTemplate includes a data structure defining the filters that should be returned. Fore example, it include parameters that the filter conditions must match for the filter to be returned.

pMatchCount includes the number of filter matches based on the specified pEnumTemplate.

pEnumHanlde includes a reference to the matched filter entries.

The keying module API 288 provides an interface between user layers 264 and the keying module 296. The keying module API 288 includes an IPSec SA Acquire method 370, an Expire Notify method 372, and an IPSec SA Acquire Complete method 374, a Keying Module Register method 376, a Keying Module Deregister method 378, an IPSec Inbound Get SPI method 380, an Add Inbound SA method 382, an Add Outbound SA method 384, an Inbound SA Expire 386 method, and a Keying Module Initiate method 388. The keying module API 288 may also include the methods previously described for the layer API, such as a Classify method 350, an Add Layer method 352 and a Delete Layer method 354.

The keying module API is used to facilitate use of known security protocols, such as defined by IPSec, used by an initiating computer and a responding computer. IPSec includes protocols such as AH or ESP. The ESP protocol is an authenticating and encrypting protocol that uses cryptographic mechanisms to provide integrity, source authentication, and confidentiality of data. The AH protocol is an authentication protocol that uses a hash signature in the packet header to validate the integrity of the packet data and authenticity of the sender.

The IKE protocol provides a method for an initiating computer and a responding computer to negotiate security settings used with the AH and ESP protocols. The negotiated security settings form a data structure called a security association (SA). The SA defines parameters such as an authentication algorithm, encryption algorithm, keys, and the lifetime of keys, used by ESP or AH to protect the contents of an IP packet. Because ESP and AH require an established SA, an IKE negotiation is executed before the ESP or AH protocols are used by the initiating and responding computer. A given SA is identified by a value known as a Security Parameter Index (SPI).

Each of the initiating and responding computers include an IPSec driver that determines, based on an IPSec policy, whether data sent between the initiating and responding computers requires encryption or authentication. The IPSec policy is a set of filters that defines how the network device uses IPSec and includes filter lists, authentication methods, and other information. In an embodiment of the invention, the IPSec policy is defined by filters included in the set of installed filters in the kernel policy engine or the filter module 294. The policy that applies to a packet is identified by invoking the keying module layer which uses the Classify method to identify matching filters.

The IPSec SA Acquire method 370 is called by the user policy engine 260 (via a client proxy) to pass a driver acquire or an external initiate request to the keying module layer. The keying module layer returns this call and does the negotiation asynchronously. Once the keying module layer has completed the negotiation, the keying module layer calls the IPSec SA Acquire Complete method 374 to notify the user firewall engine 260 that the negotiation is complete. The following is an exemplary form of the IPSec SA Acquire method.

```
typedef WIN32_ERR
(*PROCESS_IPSEC_SA_ACQUIRE0)
(
    IN FWP_IPSEC_ACQUIRE_CONTEXT0    ipsecContext,
    IN const FWP_IPSEC_SA_ACQUIRE0*  acquire,
    IN FWP_IPSEC_SPI                 inboundSAspi
);
```

Wherein the following characterizes the recited parameters:

ipsecContext is a handle to link the acquire with the SA being added.

acquire includes the necessary information for negotiating the SA according to known protocols such as IKE.

inboundSAspi includes a SPI that is used for an inbound SA.

The Expire Notify method 372 is called to pass an expire-notify to the keying module layer that added the inbound SA. The following is an exemplary form the Expire Notify method.

typedef VOID (*PROCESS_IPSEC_SA_EXPIRE0)

(

IN const FWP_IPSEC_SA_EXPIRE_NOTIFY0* expireNotify

Wherein the following characterizes the recited parameters.

expireNotify contains information identifying the expiring SA. For example, in the case of an outbound SA, the SPI is provided.

The IPSec SA Acquire Complete 374 method is called by a keying module to close the user policy engine's context after it has finished negotiation and added all the SAs, or after it has come across an error. After this method is executed, the keying module does not reuse the ipsecContext for any other API method. The following is an exemplary form the IPSec SA Acquire Complete method.

```
WIN32_ERR
FwpIPSecSAAcquireComplete0
(
    IN FWPM_ENGINE_HANDLE                   engineHandle,
    IN FWP_IPSEC_ACQUIRE_CONTEXT0           ipsecContext,
    IN const FWP_IPSEC_NEGOTIATION_STATUS0* status
);
```

Wherein the following characterizes the recited parameters.

engineHandle provides a handle to the user policy engine 260.

ipsecContext is the context passed by user policy engine with the IPSec Acquire method.

status provides status and other details of the SA negotiation. The status is returned by the user policy engine 260 if the acquire was externally initiated via, FwpKeyingModuleInitiateO.

The Keying Module Register method 376 is called by a keying module to register with the user policy engine 260 and pass its function pointers. The following is an exemplary form of the Keying Module Register method.

```
WIN32_ERR
FwpKeyingModuleRegister0
(
    IN FWPM_ENGINE_HANDLE           engineHandle,
    IN const GUID*                  keyingModuleID,
    IN const FWP_KEYING_MODULE_INFO0* keymodInfo
);
```

Wherein the following characterizes the recited parameters:

engineHandle provides the handle to the user firewall engine 260.

keyingModuleID is a unique ID for the keying module.

keymodInfo includes registration information about the keying module layer such as pointers to process IPSec SA Acquire and process IPSec SA Expire functions.

The Keying Module Deregister method 378 is called by the keying module to deregister the keying module from the user policy engine 260. The following is an exemplary form of the Keying Module Deregister method.

```
WIN32_ERR
FwpKeyingModuleDeregister0
(
    IN FWPM_ENGINE_HANDLE  engineHandle,
    IN const GUID*         keyingModuleID
);
```

Wherein the following characterizes the recited parameters:

engineHandle is the handle to the user policy engine 260.

keyingModuleID is the unique ID of the keying module.

The IPSec Inbound Get SPI method 380 is called by the keying module to obtain the SPI for a new inbound SA. The IPSec Inbound Get SPI method 380 is usually used when the keying module executes in a responding network device. The following is am exemplary form the IPSec Inbound Get SPI method.

```
WIN32_ERR
FwpIPSecSAInboundGetSpi0
(
    IN FWPM_ENGINE_HANDLE          engineHandle,
    IN const FWP_IPSEC_TRAFFIC0*   ipsecTrafficDescription,
    IN const FWP_IPSEC_UDP_ENCAP0* udpEncapInfo,
    OUT FWP_IPSEC_SPI*             inboundSpi
);
```

Wherein the following characterizes the recited parameters:
engincHandle is the handle to the user firewall engine 260.
ipsecTrafficDescription is a 5-tuple description for creating an inbound larval SA. The 5-tuple includes source and destination IP addresses, source and destination ports, and transport layer protocol type.
udpencapInfo is UDP encapsulation data for creating the larval SA. UDP encapsulation is a known method of embedding a packet formatted according to a security protocol into an unencrypted UDP packet.
inboundSpi is the SPI for the inbound SA.

The Add Inbound SA method 382 is called by the keying module layer to add an inbound SA, i.e. update the larval SA. The user policy engine 260 uses the SPI in the SA to map this call to its internal state, and ioctl the SA down to the IPSec driver. The following is an exemplary form of the Add Inbound SA method.

```
WIN32_ERR
FwpIPSecSAInboundAdd0
(
    IN FWPM_ENGINE_HANDLE         engineHandle,
    IN const FWP_IPSEC_SA_STRUCT0* inboundSA
);
```

Wherein the following characterizes the recited parameters:
engineHandle in the handle to the user policy engine.
inboundSA includes the inbound SA.

The Add Outbound SA 384 method is called by a keying module layer to add and outbound SA. The user policy engine uses an inbound SPI parameter to map this call to its internal state, and ioctl the SA down to the IPSec driver. The following is an exemplary form the Add Outbound SA method:

```
WIN32_ERR
FwpIPSecSAOutboundAdd0
(
    IN FWPM_ENGINE_HANDLE          engineHandle,
    IN FWP_IPSEC_SPI               inboundSpi,
    IN const FWP_IPSEC_SA_STRUCT0* outboundSA
);
```

Wherein the following characterizes the recited parameters:
engineHandle is the handle to the user firewall engine 260.
onboundSpi is the SPI for the inbound SA, with which an outbound SA is paired.
outboundSA includes the outbound SA.

The Inbound SA Expire method 386 is called by the keying module to expire the inbound SA that was previously added. The following is an exemplary form the Inbound SA Expire method 386.

```
WIN32_ERR
FwpIPSecSAInboundExpire0
(
    IN FWPM_ENGINE_HANDLE        engineHandle,
    IN const FWP_IPSEC_SA_EXPIRE0* expire
);
```

Wherein the following characterizes the recited parameters:
engineHandle is the handle to the user firewall engine 260.
expire includes data for the SA to be expired.

The Keying Module Initiate method 388 is called by known external application like RAS, Winsock API, and the like to initiate the keying module layer and setup SAs before an application starts sending its network traffic. The user policy engine 260 asynchronously pends the RPC call, gets the SPI from an IPSec driver, and passes the acquire to the appropriate keying module. Once the keying module layer calls FwpIPSecSAAcquireComplete0, the user firewall engine completes the asynchronous RPC with the negotiation status. The following is an exemplary form of the Keying Module Initiate method.

```
WIN32_ERR
FwpKeyingModuleInitiate0
(
    IN FWPM_ENGINE_HANDLE            engineHandle,
    IN const FWP_IPSEC_SA_ACQUIRE0*  acquire,
    IN HANDLE                        waitEvent,
    OUT FWP_IPSEC_NEGOTIATION_STATUS0* negotiationStatus
);
```

Wherein the following characterizes the recited parameters:
engineHandle is the handle to the user policy engine 260.
acquire includes data necessary for negotiating an SA.
waitevent is a handle to an event that is triggered when negotiation status is available. If a client, i.e. calling external application, is not interested in waiting for the negotiation to complete, it can set this parameter to NULL. Internally the client proxy optionally passes this event to RPC and request it to set the event once the asynchronous RPC call completes.
negotiationStatus includes an outcome of the negotiation. The negotiationStatus is NULL if waitEvent is NULL. Otherwise negotiationStatus remains valid until the waitEvent is triggered.

Figure 7:
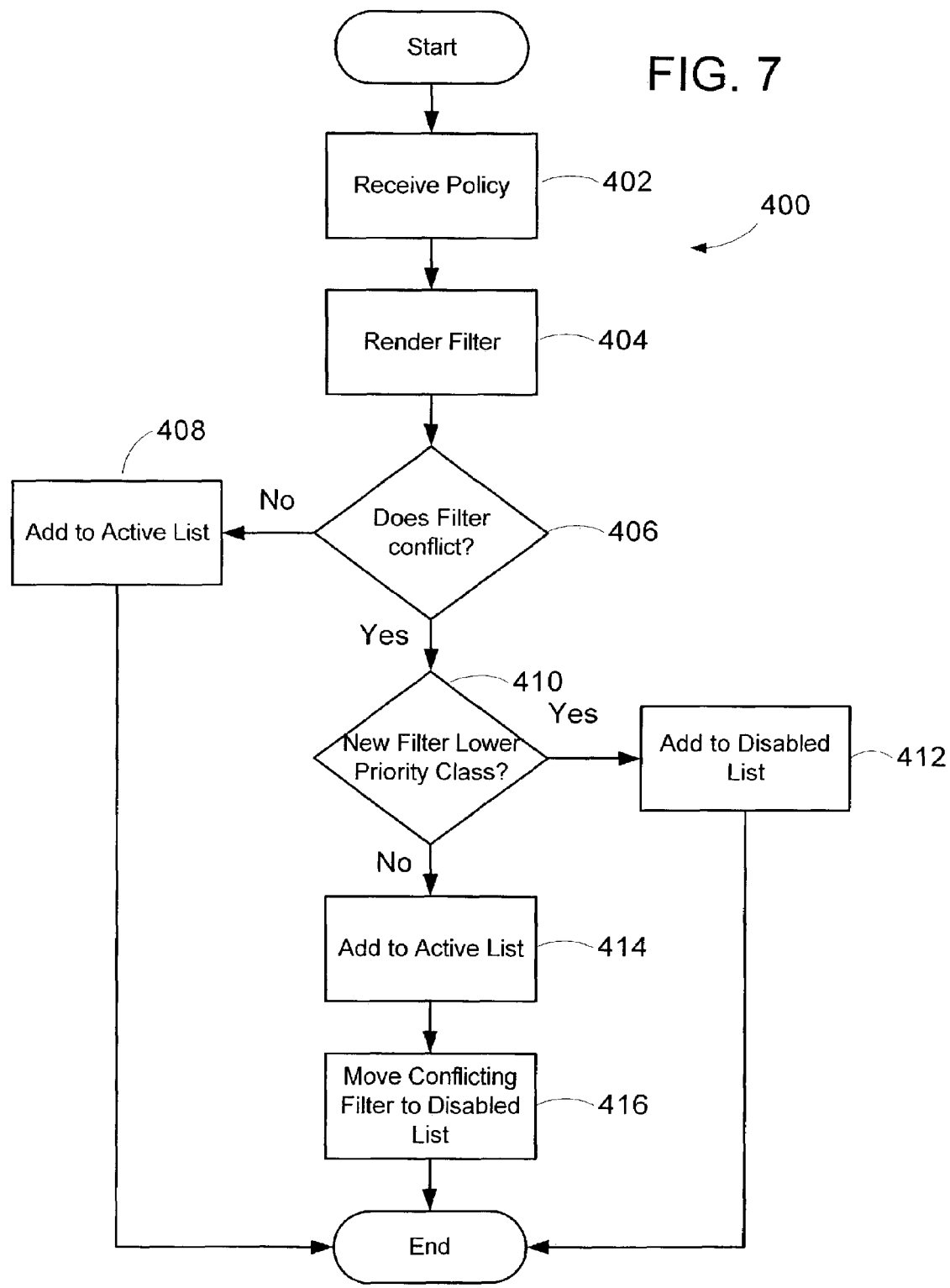
FIG. 7 is a flow chart illustrating an exemplary method used to add filters according to the present invention.

FIG. 7 illustrates a method 400 according to the present invention whereby a new filter is added to the set of installed filters 282. The method 400 permits to the new filter to be added while resolving any conflicts with other filters installed in the framework.

In step 402, the user firewall engine 260 receives new policy from one of the policy providers 262. As previously described, the policy providers 262 are any suitable source such as stored data in volatile or non-volatile memory, or through user entered data via a GUI.

The user firewall engine then renders the new policy as a new filter by defining the new policy in terms of filter properties 304, an action 306, and filter conditions 308 as shown in step 404. A filter Id 302 and policy context may also be provided.

The filter properties 304 include the priority class 310, the override allowance 312, and the weight 314. The priority class 310 is a function of identity of the user or process responsible for the new policy, e.g. user, administrator, firewall client, or guest, each of which has an assigned value. The higher the value of the priority class the higher the priority of the filter.

The override allowance 312 specifies actions in lower priority filters that can override the new filter, i.e. actions that will be taken even though the filter has a lower priority class. The override allowance is specified by the policy provider 262 and has a default of none.

The weight 314 identifies the precedence of the new filter relative to other installed filters. The weight 314 is automatically calculated by the user firewall engine 260, or alternatively is determined by the policy provider 262. A method for automatically calculating the weight is described with reference to FIG. 10.

In step 406, the user firewall engine 260 determines whether the new filter conflicts with any of the installed filters 282 that are included on the active filter list 288. The installed filters 282 are stored in the kernel firewall engine or alternatively, in filter module 294. Filters may be assigned to a particular user or kernel layer in which case conflicts only exist between the new filter and installed filters 282 assigned to the same layer. Alternatively, the user firewall engine 260 determines whether the new filter conflicts with any installed filter 282 regardless of whether filters are assigned to a particular user or kernel layer. A method of identifying whether a conflict exists is described with reference to FIG. 9. If no conflict is identified, the new filter is added to the set of installed filters 282 using, for example, the Add Filter method 364, and is added to the active filter list 288 as shown in step 408.

If the new filter conflicts with at least one installed filter, the user firewall engine 260 determines whether the new filter has a lower priority class 310 than the conflicting installed filter as shown in step 410. If the new filter does have a lower priority class 310, the new filter is added to the set of installed filter 282 and is added to the disabled list 286 as shown in step 412. Installed filters on the disabled list 286 are not identified as matching filters by the user or kernel firewall engine when responding to a classification request issued by a requesting layer.

If the new filter has a higher priority class 310 than the conflicting installed filter, the new filter is added to the set of installed filters 282 and added to the active list 288 as shown in step 414. The conflicting installed filter is then removed from the active list 288 and added to the disabled list as shown in step 416.

In the case where the conflicting installed filter is moved to the disabled filter list 286, the user firewall engine 260 also determines whether any filters identified in the disabled filter list 286 can now be moved to the active filter list 288. This occurs when a filter was disabled because it conflicted with the filter being moved from the active filter list 288 to the disabled filter list 286. If possible, any such filters are removed from the disabled filter list 286 and moved to the active filter list 288. This process may be recursive. Specifically, as each filter is added to the active filter list 288, it is necessary to disable any lower priority conflicting filters. As any filter is added to the disabled filter list, it is desirable to activate any previously overridden disabled filters.

As illustrated by the foregoing method, the new filter is always added to the set of installed filters 282 and is either included in the active filter list 288 or the disabled filter list 286. Conflicting installed filters may be changed from the active list 286 to the disabled filter list as a result of the new filter.

Figure 8:
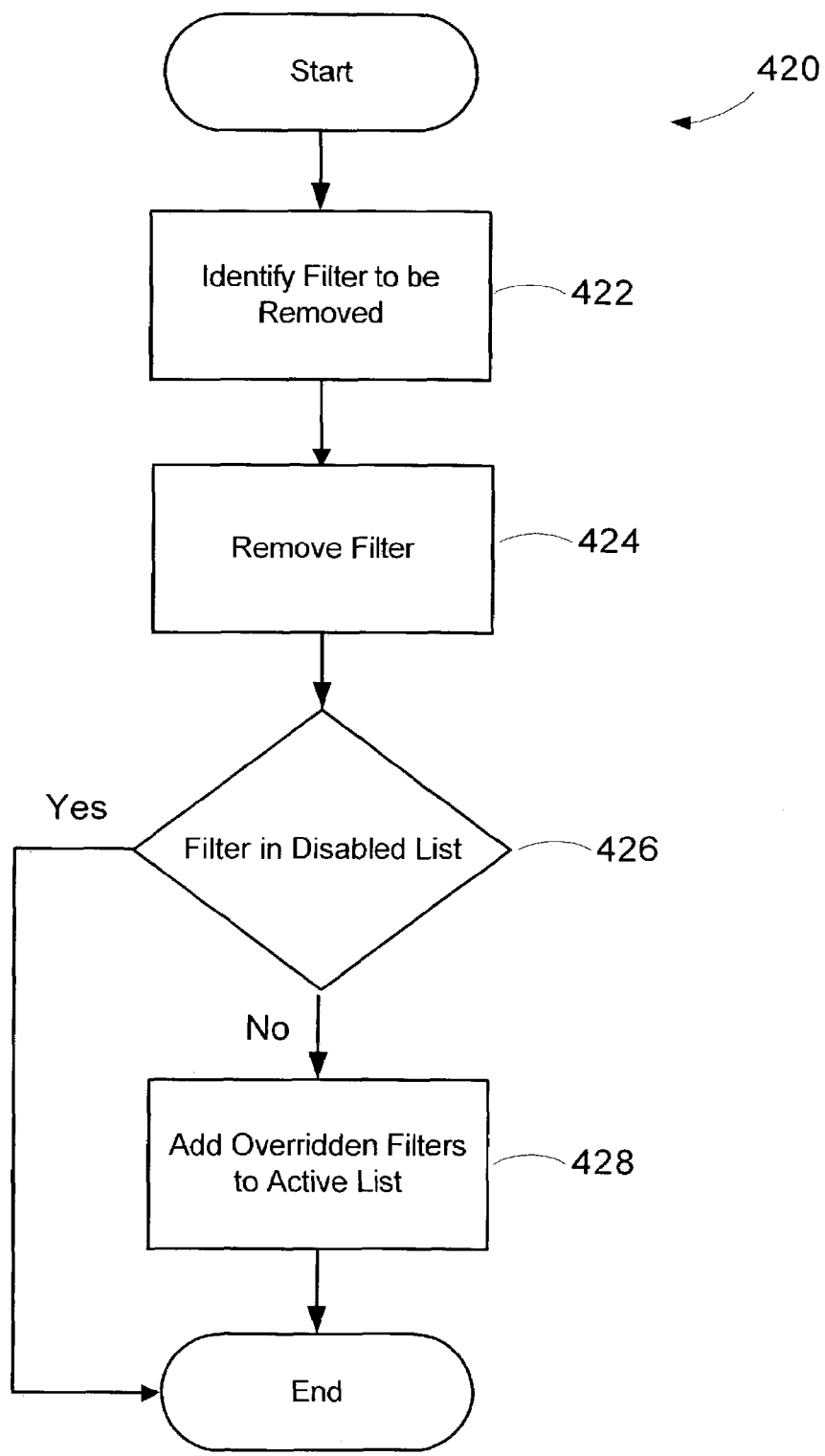
FIG. 8 is a flow chart illustrating an exemplary method used to remove filters according to the present invention.

Referring to FIG. 8, a method 420 for removing a filter from the set of installed filters 282 will now be described. In step 422, the user firewall engine 260 is invoked to remove a particular filter.

In step 422, the method 420 removes the filter from the set of installed filters 282. A method for removing a filter was described with reference to the Delete Filter method 366.

In step 426, the method 420 determines whether the removed filter was in the disabled filter list 288. If the filter was in the disabled list 288, the method ends as generally shown. If the filter was not in the disabled filter list 288, i.e. was in the active filter list 286, the method 420 optionally identifies any filters in the disabled filter list 288 that were overridden, i.e. conflicted with, the removed filter. The overridden filters are then removed from the disabled filter list 288 and added to the active filter list 286 as shown in step 428. In this manner, a previously disabled filter is activated when a higher priority conflicting filter is removed from the set of installed filters 282. Alternatively, the method does not execute steps 426 and 428 and overridden filters are maintained in the disabled filter list.

Figure 9:
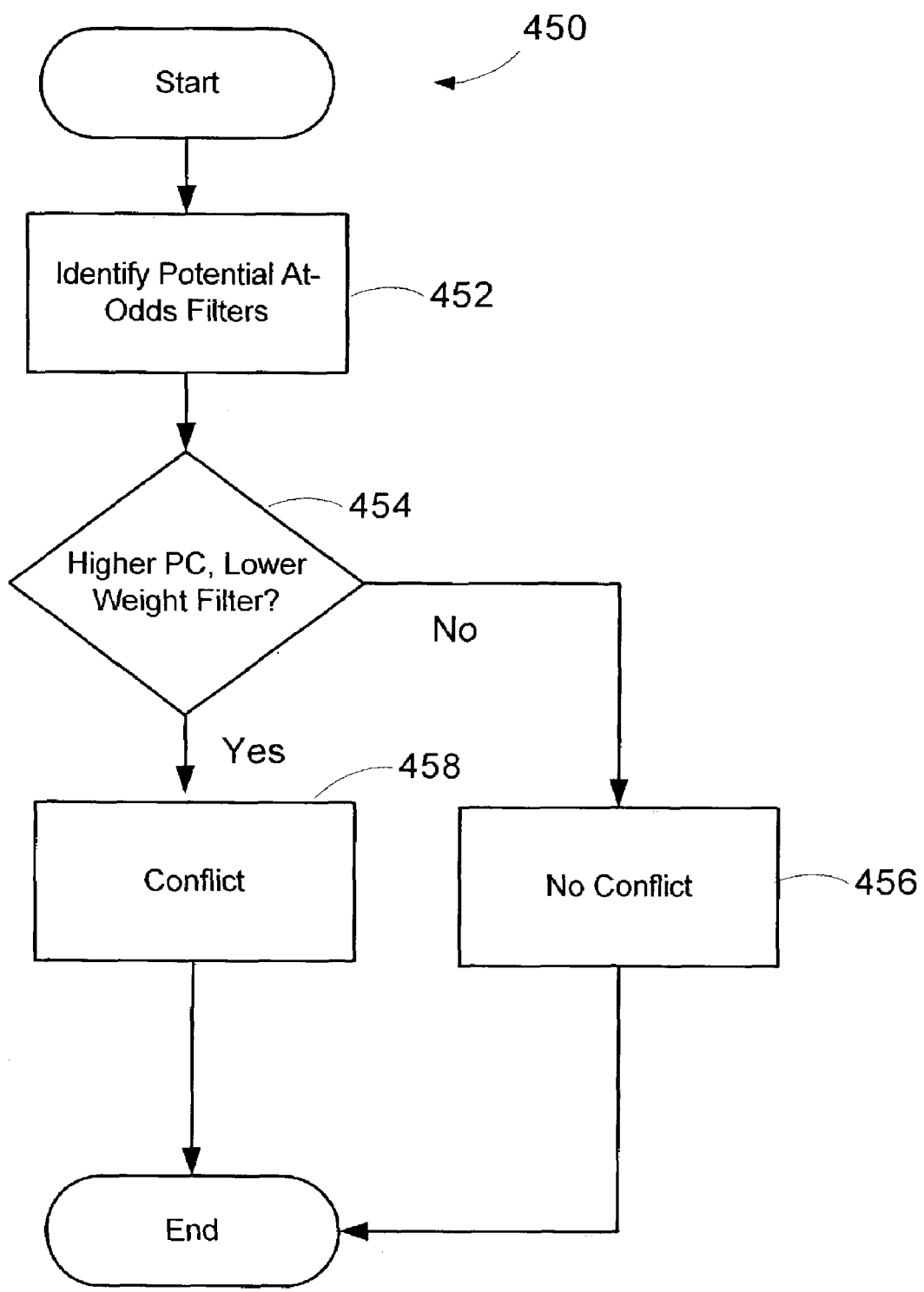
FIG. 9 is a flow chart illustrating an exemplary method used to identify filter conflicts according to the present invention.

FIG. 9 illustrates a method 450 used by the user firewall engine 260 to identify whether a first filter conflicts with a second filter. This method is used, for example, when the first filter is a new filter to be installed in the set of installed filters 282 and the second filter is an existing filter in the set of installed filters 282.

In step 452, the user firewall engine 260 identifies a set of potential at odds filters. Potential at-odds filters are filters with a common set of, i.e. overlapping, filter conditions, differentactions, e.g. permit and block, and no common override allowance. A common override allowance exists where a lower priority filter designates a different action but that action is identified as an override allowance in the higher priority filter. A method of identifying filters matching a set of criteria, such as filter conditions and actions, was described with reference to the Enum Layer method 368. In an embodiment of the invention, the user firewall engine only identifies potential at odds filters for installed filters 282 assigned to the same layer as the new filter.

In step 454 the user firewall engine 260 determines whether actual at-odds filters exist. Actual at odds filters are potential at odds filters wherein the first filter has a higher weight value 314 but a lower priority class value 310 than the second filter or vice versa. If actual at odds filters do not exist, then the method 250 determines that no conflict exists as shown in step 456 and the process ends as generally shown. If actual add odds filters do exist, the process 450 determines that a conflict does exist as shown in step 458.

Figure 10:
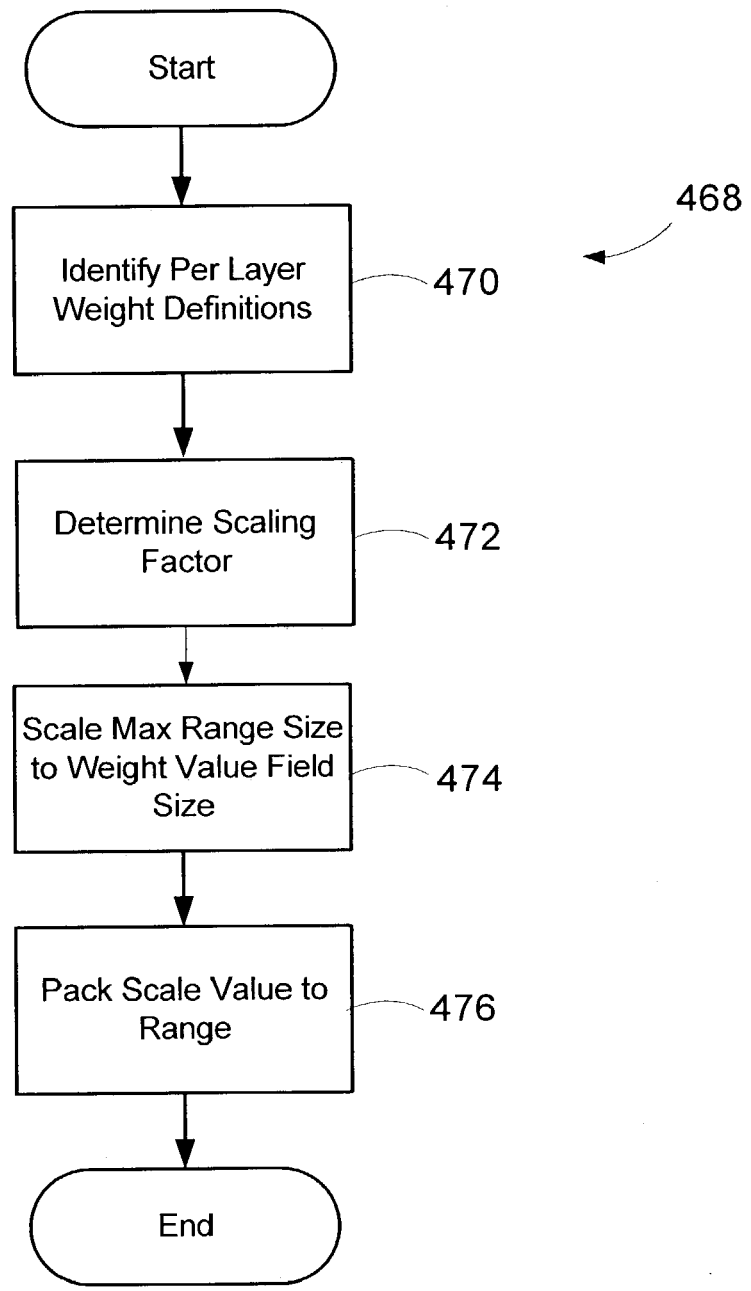
FIG. 10 is a flow chart illustrating an exemplary method used to calculate a weight value for a filter.

Turning to FIG. 10, a method 468 for automatically calculating a weight value 314 for a new filter will now be described. The weight depends on the specificity of the filter. The specificity of the filter is a function of the filter conditions 308. As a general rule, the fewer packets that a filter potentially matches, as determined by the filter conditions 308, the higher the weight value given to the filter.

As shown in step 470, the user firewall engine 260 identifies a per layer weight definition for the new filter. The per layer weight definition includes bit assignments from the weight value field 314 for filter conditions 308 for the layer assigned to the filter. In an embodiment of the invention, the weight value field is a 32-bit number. Accordingly, the per layer weight definition assigns specific bits from the 32 bits to the filter conditions for the layer. Table B illustrates an exemplary per layer weight definition for the transport layer, with bit 32 being the most significant bit and bit 0 being the least significant bit.

TABLE B

| Bits | Filter Condition |
| --- | --- |
| 25-32 | Source IP Address |
| 17-24 | Destination IP Address |
| 15-16 | Protocol |
| 11-14 | Source Port |
| 7-10 | Destination Port |
| 5-6 | Interface Number |
| 0-4 | Other/Tie Breaker |

It will be noted that some filter conditions are more significant than other filter conditions in the per layer weight definition. For example, in the per layer weight definition shown in Table B, the source IP address filter condition 308 occupies the 8 most significant bits and thus is more significant in the overall weight value than any other filter condition 308. The destination IP addresses filter condition 308 occupies the next 8 most significant bits is more significant than any other filter condition except for the source IP address filter condition. Each layer has its own per layer weight definition and the per layer weight definition in Table B is by way of illustration not limitation.

In step 472, a scaling factor is determined for each filter condition in the per layer weight definition so that the filter condition can be scaled to fit in the number of allocated bits. Any method can be used for this purpose. The following is an exemplary method used for determining the scaling factor.

$$\text{Log}_N(\text{Max Filter Condition Range Size}) = (\text{Max Weight})$$

Wherein the following characterizes the recited paramters.

N is the scaling factor.

Max Filter Condition Range Size is the maximum range of the filter condition. For example, in the case of IPv4 addresses, the Max Filter Condition Range Size is 32 bits which translates into $2^{32}$ or approximately 4.3 billion. In the case of source and destination ports, the Max Filter Condition Range Size is $2^{16}$ or 65,536.

Max Weight is the maximum value that can be placed in the number of bits assigned to the filter condition in the weight value field 314. For example, in the above example, the source and destination IP addresses are each allocated 8 bits, which renders a maximum weight value of $2^8-1$ or 255. The protocol is allocated 2 bits, which renders a maximum weight of value of $2^2-1$ or 3. The source and destination ports are each allocated 4 bits, which renders a maximum weight value of $2^4-1$ or 15.

Using the above scaling method, the user firewall engine 260 solves for the scaling factor N. As a specific example, if the filter condition is the source IP address and is allocated 8 bits in the weight value field 314, solving for N in the equation $\text{Log}_N(2^{23})=(255)$ yields $N \cong 1.09051$.

In step 474, each of the filter conditions is scaled to fit in the number of bits in the weight value field 314 using the scaling factor. The following how the filter condition is scaled using the previoulsy described scaling method.

$$\text{Scaled Weight Value} = (\text{Max Weight}) - \text{Log}_N(\text{Total Num Filter Condition Values})$$

Wherein the following characterizes the recited values.

Scaled Weight Value is the weight value to be placed in the bits assigned in the weight value.

Max Weight is the Maximum value that can be placed in the number of bits assigned to the filter condition in the weight value field 314.

N is the scaling factor as previously described.

Total Num Filter Condition Values is the number of values specified in the filter condition. For example, if a single IP addresses is specified as the filter condition, the Total Num Filter Conditions Values is 1. If a range of 10 IP addresses is specified, the Total Num Filter Conditions is 10 and so on.

As a specific, assume that the filter condition specifies a source IP range of 1.2.3.0 to 1.2.3.255. The number of source IP addresses in the range of 1.2.3.0 to 1.2.3.255 is 256 addresses. The Scaled Weight Value equals $255 - \text{Log}_{1.09051}(255) = 193$.

In step 478, the Scaled Weight value is placed in the weight value field in the bits assigned to the filter condition. In the example, the value of 193 is placed as a binary number into bit fields 25 through 32.

The per weight layer weight definition may allocated a number of bits to a tiebreaker condition, usually the least significant bits. The tiebreaker value is used to ensure that each filter has a unique weight value 314. The tiebreaker value may be determined using an suitable method. For example, it may be a value that is incremented by a value of 1 for each new installed filter. Alternatively, it may be a random number provided that the same random number is not used for more than one filter.

The method 468 is completed for each filter condition that is specified in the per layer weight definition thereby rendering the 32-bit weight value field 314. Alternatively, two or more filter conditions are combined into a single weight space. For example a single weight space includes 2*(scaled source IP address)+(scaled destination IP address).

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of adding a new filter defining a portion of a network policy into a set of installed filters in a framework including a set of active filters and a set of disabled filters, the new filter and each filter in the set of installed filters including a set of filter conditions and a priority class comprising:

determining whether at least one installed filter in the set of the installed filters conflicts with the new filter; and if the at least one installed filter in the set of the installed filters conflicts with the new filter:

identifying whether the priority class of the new filter is lower than the priority class of the at least one installed filter, wherein the priority class is a function of identity of a user or a process responsible for adding the new filter;

if the priority class of the new filter is lower than the priority class of the at least one installed filter, adding the new filter into the set of installed filters as one of the set of disabled filters; and if the priority class of the new filter is higher than the priority class of the at least one installed filter, adding the new filter into the set of installed filters as one of the set of active filters.

2. The method of claim 1, wherein the set of active filters are identified in an active filter list and the set of disabled filters are identified in a disabled filter list.

3. The method of claim 1, further comprising: identifying the at least one installed filter as one of the set of disabled filter list.

4. The method of claim 1, wherein the new filter and each of filters in the set of installed filters include a weight value, further comprising: calculating the weight value of the new filter by applying a scaling factor to each of the filter conditions resulting in a set of scaled filter conditions and including the scaled filter conditions in the weight value.

5. The method of claim 4, whereby the step of determining that the at least one installed filter in the set of the installed filters conflicts with the new filter comprises: retrieving a set of potential at-odds filters from the set of installed filters with a matching set of filter conditions and a set of contradictory actions; identifying a set of actual at-odds filters based on a comparison of the priority class and the weight value of the potential at-odds filters and the priority class and the weight value of the new filter.

6. The method of claim 5, wherein the priority class of the new filter is higher than the priority class of at least one of the set of actual at-odds filters and the weight of the new filter is lower than the weight of the at least one of the set of actual at odds filters.

7. The method of claim 5, wherein the priority class of the new filter is lower than the priority class of at least one of the set of actual at-odds filters and the weight of the new filter is higher than the weight of the at least one of the set of actual at-odds filters.

8. The method of claim 1, further comprising, if the priority class of the new filter is higher than the priority class of the at least one installed filter, moving the at least one installed filter into the set of disabled filters.

9. A computer storage medium encoded with computer-readable instructions for performing acts of adding a new filter defining a portion of a network policy into a set of installed filters in a framework including an active filter list and a disabled filter list, the new filter and each filter in the set of installed filters including a set of filter conditions and a priority class, the acts comprising:

determining whether at least one installed filter in the set of the installed filters conflicts with the new filter; and if the at least one installed filter in the set of the installed filters conflicts with the new filter:

identifying whether the priority class of the new filter is lower than the priority class of the at least one installed filter, wherein the priority class is a function of identity of a user or a process responsible for adding the new filter;

if the priority class of the new filter is lower than the priority class of the at least one installed filter, adding the new filter into the set of installed filters as one of the set of disabled filters; and if the priority class of the new filter is higher than the priority class of the at least one installed filter, adding the new filter into the set of installed filters as one of the set of active filters.

10. The computer storage medium of claim 9, wherein the acts further comprise: adding the at least one installed filter to the disabled filter list.

11. The computer storage medium of claim 9, wherein the new filter and each of the filters in the set of installed filters include a weight value, further comprising: calculating the weight value by applying a scaling factor to each of the filter conditions resulting in a set of scaled filter conditions and including the scaled filter conditions in the weight value.

12. The computer storage medium of claim 11, wherein the acts further comprise the step of determining that the at least one installed filter in the set of the installed filters conflicts with the new filter comprises: retrieving a set of potential at-odds filters from the set of installed filters with a matching set of filter conditions and a set of contradictory actions; identifying a set of actual at-odds filters based on a comparison of the priority class and the weight value of the potential at odds filters and the priority class and the weight value of the new filter.

13. The computer storage medium of claim 9, wherein the acts further comprise, if the priority class of the new filter is higher than the priority class of the at least one installed filter, moving the at least one installed filter into the set of disabled filters.

* * * * *

UNITED STATES PATENT AND TRADEMARK OFFICE
CERTIFICATE OF CORRECTION

| | | |
|---|---|---|
| PATENT NO. | : 7,409,707 B2 | Page 1 of 1 |
| APPLICATION NO. | : 10/456433 | |
| DATED | : August 5, 2008 | |
| INVENTOR(S) | : Brian D. Swander et al. | |

It is certified that error appears in the above-identified patent and that said Letters Patent is hereby corrected as shown below:

In column 23, line 58, after "address and" insert -- it --.

In column 23, line 62, after "number of" insert -- assigned --.

In column 23, line 63, after "following" insert -- illustrates --.

Signed and Sealed this

Twenty-sixth Day of April, 2011

David J. Kappos
*Director of the United States Patent and Trademark Office*